No. 639,917. Patented Dec. 26, 1899.
C. R. ARNOLD.
MIRROR STAND.
(Application filed Feb. 17, 1899.)
(No Model.)
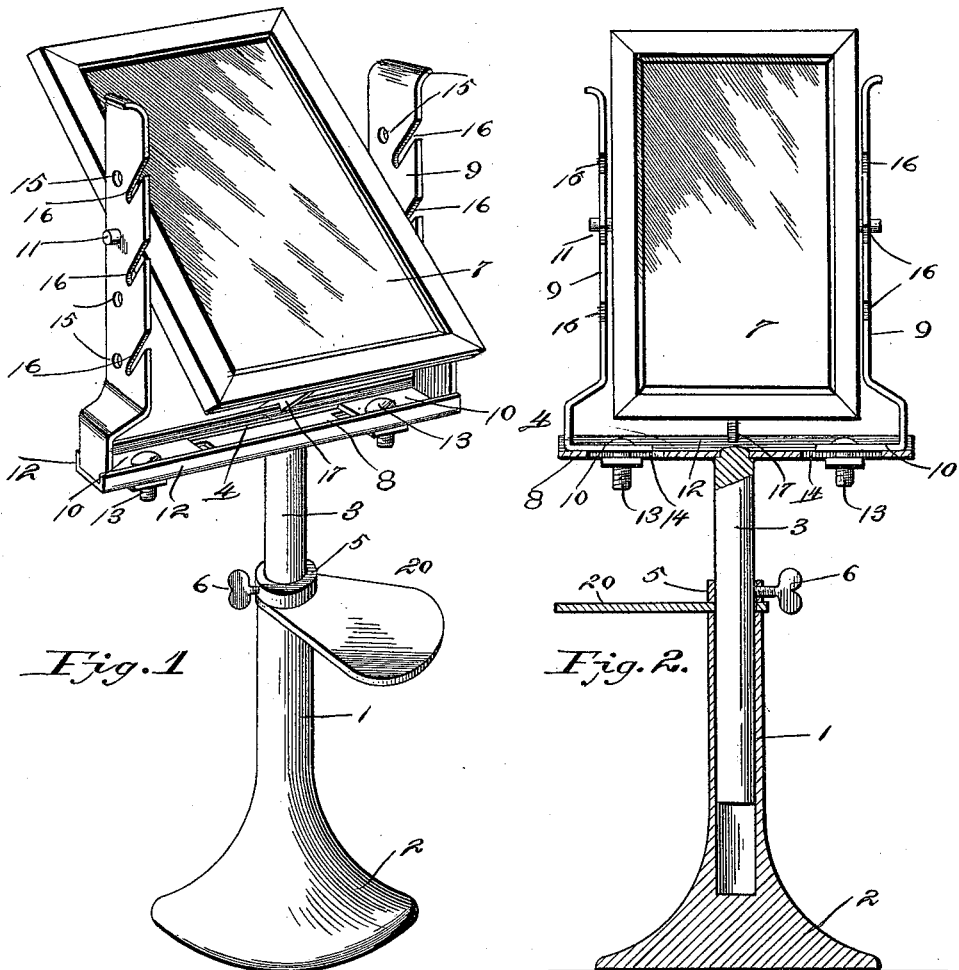
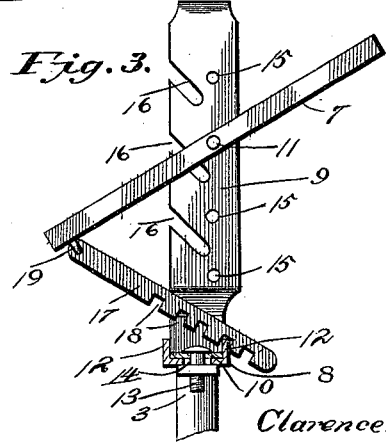
Witnesses
Clarence N. Walker
H. J. Riley
Clarence R. Arnold. Inventor
By his Attorneys.
C. A. Snow & Co.
THE NORRIS PETERS CO., PHOTO-LITHO., WASHINGTON, D. C.

UNITED STATES PATENT OFFICE.

CLARENCE ROCKWELL ARNOLD, OF WELLSVILLE, OHIO.

MIRROR-STAND.

SPECIFICATION forming part of Letters Patent No. 639,917, dated December 26, 1899.

Application filed February 17, 1899. Serial No. 705,826. (No model.)

*To all whom it may concern:*

Be it known that I, CLARENCE ROCKWELL ARNOLD, a citizen of the United States, residing at Wellsville, in the county of Columbiana and State of Ohio, have invented a new and useful Mirror-Stand, of which the following is a specification.

The invention relates to improvements in mirror-stands.

The object of the present invention is to improve the construction of mirror-stands and to provide a simple, inexpensive, and efficient one capable of ready adjustment to accommodate mirrors of different sizes and adapted to be readily arranged at the desired elevation, so that a mirror may be used for a variety of purposes.

A further object of the invention is to provide means for supporting a mirror at the desired inclination and to enable the same to be mounted on it for permanent or temporary use and to permit a mirror to be readily detached from the bracket.

The invention consists in the construction and novel combination and arrangement of parts hereinafter fully described, illustrated in the accompanying drawings, and pointed out in the claims hereto appended.

In the drawings, Figure 1 is a perspective view of a mirror and stand constructed in accordance with this invention. Fig. 2 is a vertical sectional view. Fig. 3 is a detail sectional view illustrating the construction of the bracket and the means for supporting the mirror at an inclination.

Like numerals of reference designate corresponding parts in all the figures of the drawings.

1 designates a tubular support consisting, preferably, of a standard provided at its lower end with a base 2; but the form of the tubular support may be varied, if desired, to provide an ornamental stand. The tubular standard receives a vertically-adjustable stem or rod 3, carrying the bracket 4 and secured at any desired adjustment by a ring or collar 5, located above the tubular support and provided with a clamping-screw 6; but the clamping-screw may be mounted on the support, if desired.

The bracket 4, which receives a mirror 7, is adjustable to enable mirrors of different sizes to be employed, and it is composed of a horizontal bottom piece 8 and sides 9, provided at their lower ends with inwardly-extending arms 10 and having suitable bearings for the reception of the pivots 11 of the mirror. The bottom piece 8, which is fixed to the upper end of the rod or stem 3, is provided at opposite sides with upwardly-extending longitudinal flanges 12, between which the arms 10 are arranged, and the said arms 10 are secured at the desired adjustment by fastening devices 13, consisting of bolts or the like passing through perforations of the arms and arranged in slots 14 of the bottom piece 8, the slots permitting the necessary adjustment of the sides on the bottom piece. The bolts are provided with nuts for securing the sides at the desired adjustment, and by providing the parallel flanges of the bottom piece the sides are prevented from turning on the fastening devices, and a single fastening device is sufficient to hold each side.

The sides, which are bowed outwardly near their lower ends, have parallel upper portions provided with perforations 15 and inclined slots 16, adapted to form bearings for the pivots 11 of the mirror 7. When the mirror is designed to be permanently mounted on the stand, the pivots are arranged in two of the perforations; but by placing the pivots in the inclined slots the mirror may be readily removed from the stand when desired.

The mirror is supported at the desired inclination by means of a bar or brace 17, connected at its upper end with the bottom of the mirror and provided with a series of notches 18, adapted to receive one of the flanges of the bottom piece of the bracket, as illustrated in Fig. 3 of the accompanying drawings. The upper end of the brace or bar is provided with a perforation and is linked into an eye 19, consisting of a staple or other suitable fastening device mounted on the back of the mirror.

The stand is provided with an adjustable shelf 20, designed for supporting a comb and brush, shaving-mug, or the like and having an extension interposed between the collar or ring and the top of the tubular support, said extension being provided with an opening for the passage of the rod or stem which carries the bracket.

The invention has the following advantages: The stand, which is simple and comparatively inexpensive in construction, is capable of ready adjustment to vary the width of the bracket to enable mirrors of different sizes to be supported, and a mirror may be temporarily or permanently pivoted to the sides of the bracket. The stand is adapted to adjust the mirror vertically and to hold it at any inclination to enable the same to be employed for a variety of purposes, such as shaving or use in connection with the mirror of a bureau or other large looking-glass.

Changes in the form, proportion, size, and the minor details of construction within the scope of the appended claims, such as varying the construction of the tubular support to render the stand more or less ornamental, may be resorted to without departing from the spirit or sacrificing any of the advantages of this invention.

What is claimed is—

1. A mirror-stand comprising a support, a bracket mounted on the support and composed of a bottom portion provided with parallel side flanges, and sides having horizontal arms at their lower ends arranged between the parallel side flanges and adjustably secured to the bottom portion, whereby the sides are adapted to be moved toward and from each other, and a mirror pivotally mounted on the sides and arranged between the same, substantially as described.

2. A device of the class described comprising a vertical support, an adjustable bracket mounted on the support and composed of a bottom portion having parallel flanges and sides adjustably secured to the bottom portion, a mirror journaled between the sides, and a notched bar or brace hinged to the mirror and engaging one of the flanges of the bottom portion of the bracket, substantially as described.

In testimony that I claim the foregoing as my own I have hereto affixed my signature in the presence of two witnesses.

CLARENCE ROCKWELL ARNOLD.

Witnesses:
FRANK L. WELLS,
WILLIAM R. MACDONALD.